United States Patent [19]

Slagle

[11] 4,240,380
[45] Dec. 23, 1980

[54] WATER INJECTION SYSTEM

[76] Inventor: Bernie L. Slagle, Rte. 206, R.D. #6, Vincentown, N.J. 08088

[21] Appl. No.: 779,723

[22] Filed: Mar. 21, 1977

[51] Int. Cl.³ .................................... F02M 25/02
[52] U.S. Cl. ........................ 123/25 L; 123/25 A; 261/18 A
[58] Field of Search ............. 123/25 P, 25 L, 25 A, 123/25 K, 198 A; 261/18 A

[56] References Cited

U.S. PATENT DOCUMENTS

| | | | |
|---|---|---|---|
| 3,631,843 | 1/1972 | Yeiser | 123/25 L |
| 3,845,745 | 11/1974 | Dunlap et al. | 123/25 L |
| 3,955,542 | 5/1976 | Skaggs | 123/25 L |
| 4,027,630 | 6/1977 | Giardini | 123/25 P |
| 4,096,829 | 6/1978 | Spears | 123/25 L |

*Primary Examiner*—Ira S. Lazarus
*Attorney, Agent, or Firm*—Duffield & Lehrer

[57] ABSTRACT

Water is pumped from a holding tank through nozzle means to an area above the carburetion means on an internal combustion engine. The pumping means is controlled by diaphragm means reacting to intake manifold pressure as well as manual control. Filtering means are provided to allow the use of normal tap water. The diaphragm control means operates only after intake manifold pressure has risen to a certain point and ceases to operate after it has arisen above a second point or pressure. In another version, a variable pump is used to provide water in direct relationship to the manifold pressure over the indicated or selected range. The nozzle and the carburetion means act together to provide proper atomization of the water in the fuel air mixture.

9 Claims, 6 Drawing Figures

WATER INJECTION SYSTEM

BACKGROUND OF THE INVENTION

This disclosed device relates generally to internal combustion engines and more particularly to an improved system of injecting water into fuel air mixtures of internal combustion engines for the purpose of improving performance, lessening air pollution, improving fuel economy and other attributes.

The effect of adding water to a fuel air mixture of an internal combustion engine and its results are well known and well described in the background of the invention section of the U.S. Pat. No. 3,845,745 issued Nov. 5, 1974 to Charles R. Dunlap and Harris P. Hines (hereinafter referred to as Dunlap).

Dunlap also discussed other means of supplying water to the internal combustion engine fuel air mixtures and show how the application of water may also be supplied to the individual combustion chambers of an engine.

OBJECT AND SUMMARY OF THE INVENTION

It is therefore a primary object in this invention to provide an improved water injection system for internal combustion engines of any type.

The inventor also seeks to improve upon the atomization of water in the fuel air mixture of an internal combustion engine while not adding to the complexity of the carburetion system to the extent of some of the recent additions on such internal combustion engines as used in automobiles produced in the United States of America in response to the pressing pollution problem of the Nation.

Also by simplifying the water injection system to a minimal number of parts and providing filtering systems, the inventor seeks to make the device easy to maintain, lessen its chance of malfunction and provide an easy source of water to mix with the fuel.

To a certain extent, this device like any other water injection system also allows the utilization of unleaded gasoline without sacrificing horseppower or other factors of engine performance. This will also result in substantially reducing harmful emissions as a result of the removal of the lead function of the gasoline.

An added benefit of any other water injection system as well as this particular system is that the engine efficiency is raised improving fuel economy, reducing carbon deposits and other ash reminents of the gasoline and improving the overall operation of the internal combustion engine and reducing the maintenance of the engine in its entirety due to its better performance.

The basic scheme behind the present invention is to use a pumping means to deliver water from a holding tank to nozzles mounted above the carburetion means of the internal combustion engine of which the system is a part. The pumping means provides that the tank holding the water does not have to be mounted so as to develop a head for feeding purposes. Filtering means are provided in the supply line at various points to remove impurities from ordinary tap water and to allow ordinary tap to be used in place of distilled water as is usually required on other water injection systems. A check valve is applied in the supply line to keep the supply line fully charged with water from the pump to the nozzles mounted above the carburetion means so that immediately upon activating the pumping means, water begins to be mixed with the fuel air mixture and no delay in charging the supply line is encountered. The mounting and location of the nozzles makes use of the vortex attributes of the carburetion means to obtain proper atomization of the water in the fuel air mixture getting an even distribution between all combustion cylinders of a multicylinder engine.

The pumping means is activated by a pressure sensitive control means which has two stages. The first stage of the pressuresensitive control means initially turns on the pumping means when the intake manifold negative pressure reaches a predetermined level, proving, therefore, that the engine is operating. The second stage of the pressure sensitive control means shuts the pumping means off when the manifold negative pressure rises above a higher negative level. Additional manual control means is supplied to control the pumping means.

The various means are disclosed to allow the controlling pumping means in various modes. Briefly, the control means can be an infinitely variable potentiometer or a plurality of ganged microswitches operated by a diaphragm means allowing a various levels of voltage to be supplied to the pumping means through a plurality of resisters or short circuits that are controlled by said ganged microswitches.

DESCRIPTION OF PREFERRED EMBODIMENT

Figure 1:
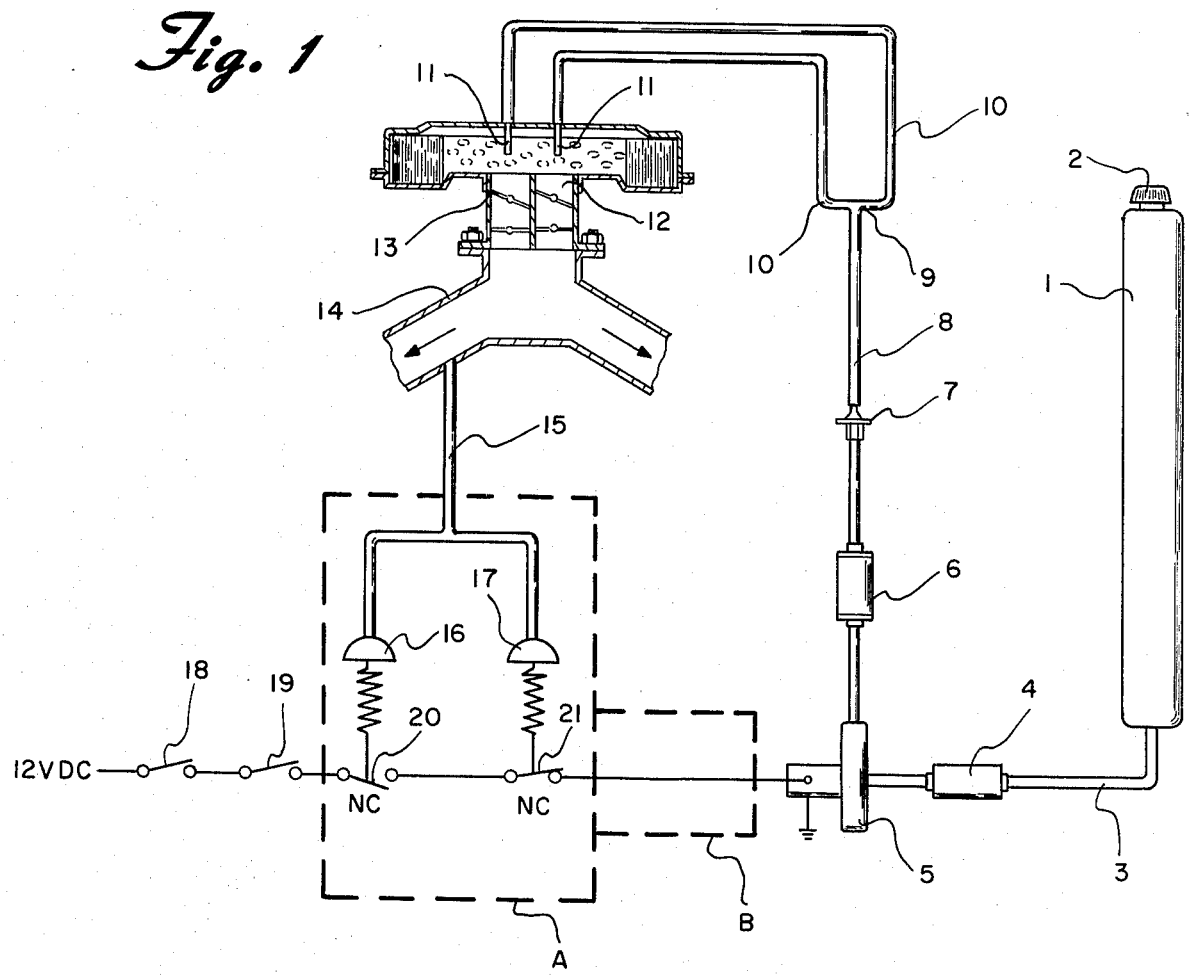
FIG. 1 shows an overall pictorial and schematic view of the invention as described in the basic embodiment.

With reference now to the drawings and specifically FIG. 1, a basic embodiment of the invention is shown in generally pictorial or schematic representation. A holding tank (1) containing ordinary tap water for use in the disclosed injection system, is mounted on an automobile engine compartment wall wherever convenient and mounting space is available. An inlet (2) for the filling of water into said holding tank (1) is provided. From said holding tank (1), there is a discharge line (3) leading through a first filtering means (4) to the pumping means (5).

Said pumping means (5) discharges the water through a discharge line (8) flowing through a second filtering means (6) and check valve means (7) to a diverter (9). The diverter (9) divides the water flow from the pumping means (5) through supply lines (10) to a multiplicity of nozzles (11) mounted above a carburetion means (13). The water discharged from the nozzles (11) is mixed and atomized by the vortex action caused by the carburetion means (13) and the various components of said carburetion means (13). The vortex action is located in the upper carburetor area (12).

Pumping means (5) is electrically driven by the twelve volt or other power source for the internal combustion engine to which this system is attached.

The controls for said pumping means (5) are an ignition interlock feature (18), a manual control switch (19), pressure sensitive means (A) and sub-controlling means (B).

The pressure sensitive means (A) in FIG. 1 comprises a first vacuum diaphragm means (16) and a second vacuum diaphragm means (17). Both the first vacuum diaphragm means (16) and the second vacuum diaphragm means (17) are connected to the intake manifold (14) of the internal combustion engine of which this system is a part by vacuum line (15). The first vacuum diaphragm means (16) is connected to first control switch (20). If the internal combustion engine is non-operating, the first vacuum diaphragm means (16) is in such a position as to hold the first control switch (20) in an open position. Upon starting the internal combustion engine, first vacuum diaphragm means (16) contracts and closes the first control switch (20) completing the circuit from manual switch (19) to second control switch (21).

Second control switch (21) is a normally closed switch. If the internal combustion engine is not running second vacuum diaphragm means (17) allows second control switch (21) to remain closed. However, upon starting the internal combustion engine in the application of a negative pressure to the second vacuum diaphragm means (17), upon reaching a predetermined level of vacuum or negative manifold intake pressue is reached at which time normally closed second contral switch (21) is opened. The opening of normally closed second control switch (21) interrupts the power to pumping means (5).

The operation of the first vacuum control means (16) and second vacuum diaphragm means (170 and first and second control switches (20) and (21) allow power to reach pumping means (5) only when the internal combustion engine is running and its vacuum pressure is below the operating point of second control switch (21) and second vacuum diaphragm means (17).

Figure 4:
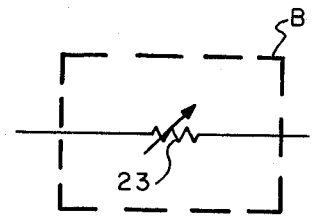
FIGS. 4 and 5 are alternate components of subcontrolling means.
Figure 5:
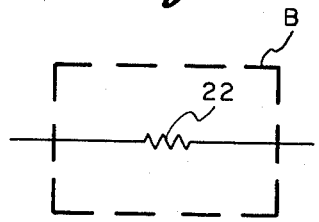

Subcontrol means (B) can consist of merely an electrical connection between pressure sensitive menas (A) and pumping means (5); or as shown in FIG. 5, a fixed resistance (22); or as in FIG. 4, a variable resistance (23).

Figure 2:
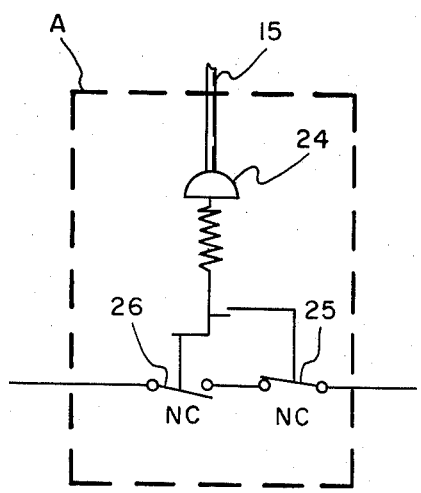
FIG. 2 is a preferred disclosed embodiment of pressure sensitive means.

As a further disclosed embodiment, the inventor conceives of an improvement to the pressure sensitive means (A), as disclosed in FIG. 2 of the drawings to which reference is now made. In FIG. 2, a single vacuum diaphragm means (24) is shown operating two limit switches, respectfully the first control switch (26) and the second control switch (25). The first control switch (26) performs the same function as the first control switch (20) in the previous disclosed embodiment except that it is a normally closed switch which is held open by the single diaphragm control means (24) when the internal combustion engine is not operating; but is allowed to close when said engine is operating. Single diaphragm vacuum control means (24) then moves through a limits of travel to operate second control switch (25) which is a normally closed switch breaking the circuit at the upper limit of pressure as did control switch (21) in the previous disclosed embodiment.

Figure 3:
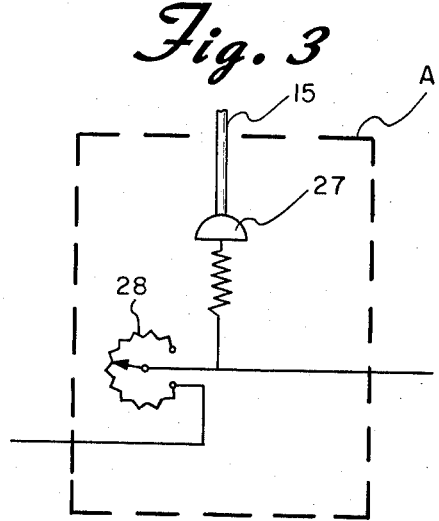
FIG. 3 is a schematic rendition of a second embodimentof pressure sensitive means.

In FIG. 3, a third disclosed embodiment is considered by the inventor in which control switches (26) and (25) of the prior embodiment are eliminated and a potentiometer (28) is inserted. The function operates to give a variable control to pumping means (5) in relationship to the vacuum existing in intake manifold (14) rather than just a simple on/off situation as exists in the two prior disclosed embodiments.

Figure 6:
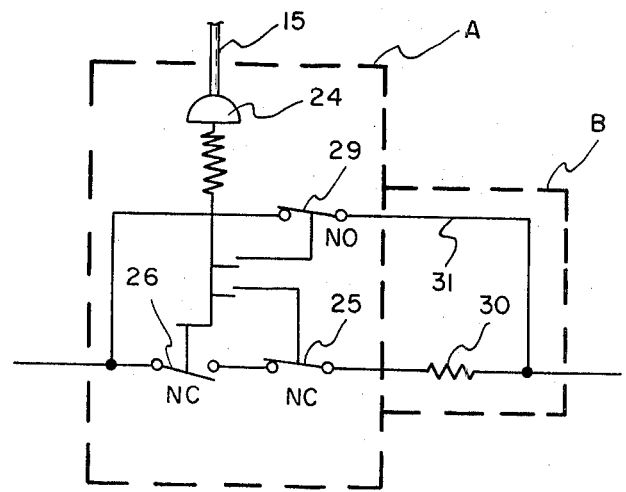
FIG. 6 is an additional disclosed embodiment of pressure sensitive means and subcontrolling means.

In FIG. 6, yet another disclosed embodiment of pressure sensitive means (A) is shown. This described embodiment is the same arrangement as shown in FIG. 2 above with the addition of third control switch (29) which is a switch that will open after the internal combustion engine is running at a desired vacuum levels in intake manifold (14) and recloses to short out a fixed resistance (30) by way of circuit (31) in subcontrol means (B) to give added electrical power to the pumping means (5) in a two stage control system. This system is best explained by an example.

If an engine normally running at optimum vacuum pressure has twenty inches of negative pressure and you have set second control switch (25) to close at a sixteen inches negative pressure to turn on a certain amount of water flowing through pumping means (5), third control switch (29) will close at a negative pressure of twelve inches causing a higher volume of water to go through pumping means (5) due to the increase of the power coming from the electrical power source. This supplies a modest amount of water for modest drops in the manifold negative pressure and greater amounts of water for a greater manifold negative pressure drops.

Again, referred to FIG. 1, the overall operation of the disclosed invention is as follows: The operator first fills the holding tank (1) with ordinary tap water and then proceeds to operate his automobile, truck or other vehicle powered by an internal combustion engine in a normal manner. Having started the automobile or other internal combustion engine powered vehicle the safety interlock switch (18) is closed, thereby allowing electrical power to flow to the manual control switch (19) which is closed to power up the water injection system. If the operator does not desire to use the water injection system, manual control switch (19) is moved to the "off" position.

Assuming that the water injection system is desired to be used and manual control switch (19) is closed, once the engine has started and intake manifold pressure has risen to a certain point, the first control switch (20) of the pressure sensitive means (A) is closed and an electrical circuit is made from the power source to a second control switch (21) and so long as a second control switch (21) is closed which would be if intake manifold pressure is below a predetermined level and the electrical circuitis completed through to pumping means (5). Pumping means (5) when activated draws water from holding tank (1) through first filtering means (4) discharging water through the second filtering means (6), check valve (7), through supply lines (10), to nozzles (11). Water comes out of nozzles (11) being mixed by vortex action of carburetion means (13) thereby improving the performance of an internal combustion engine. As the performance is improved the negative pressure rises causing the pressure sensitive means (A) specifically second vacuum diaphragm means (17) to open second control switch (21). Opening second control switch (21) stops power flowing through to pumping means (5) thereby stopping the water flow through the system. Not until the negative pressure decreases to the desired level which control switch (21) is thereby closed does the water begin to flow.

This shutting off the water at the high negative pressure is an essential part of this invention as the power of the engine increases to a point where the addition of water no longer is beneficial as an additive to the fuel air mixture. This conserves water in the operation of the internal combustion engine and allows for a smaller tank to be installed on a vehicle using this system as opposed to other prior art systems which operate continually.

In the disclosed embodiment of a pressure sensitive means (A) in FIG. 3, the controls are such that potentiometer (28) has such a resistance when the negative pressure is at a high level that pumping means (5) will not operate, due to the low amount of current flowing through the high resistance of potentiometer (28). While, when the negative pressure is at a low level, the resistance of potentiometer (28) is reduced therefore allowing higher amounts of current through the electrical circuits to pumping means (5) allowing it to pump water.

All switches which are described in this disclosure as normally opened or normally closed can be of the other variety depending upon the physical connection existing between said switch and the control means operating said switch.

FIGS. 4 and 5 disclose various types of resistences that can be placed in the circuit between the pressure sensitive means (A) and the pumping means (5) to accomodate different voltages, currents and power ratings of various styles of pumping means (5).

While there are a number of available devices for constructing the pressure sensitive device, the inventor is using at the present time a diaphragm type of device as a preferred mode of sensing the intake manifold pressure.

The sensor controlling the pump is connected to the intake manifold pressure as that intake manifold pressure is a better indicator of need for the application of water in an application where the main purpose is to improve engine performance as is considered by this inventor to be the main purpose of the invention or water injection system as opposed to using such complicated devices as temperature cylinder sensors speed regulators or other such costly and complicated systems for controlling the pumping means.

What is claimed is:

1. A water injection system for an internal combustion engine having carburetor means, a plurality of combustion chambers and a manifold through which a fuel air mixture is fed to said combustion chambers comprising:
    a reservoir for holding a supply of tap water;
    a powered pump means and means connecting the same to said reservoir for providing pressurized water from said reservoir;
    nozzle means located in the upper part of said carburetor means, and means connecting the output of said pump means to said nozzle means;
    control means for controlling the operation of said pump means;
    pressure sensitive means connected to said manifold and to said control means and being responsive to the pressure within said manifold;
    said pressure sensitive means and said control means activating said pump means when said pressure sensitive means senses a first predetermined pressure and deactivating said pump means when said pressure sensitive means senses a second and different predetermined pressure said pump means delivering a constant volume of water to said nozzle means regardless of the engine speed whenever said pump means is activated.

2. A water injection system as claimed in claim 1 wherein said pressure sensitive means includes a diaphragm means.

3. A water injection system as claimed in claim 1 wherein said pump means is electrically operated and wherein said control means includes electric switching means.

4. A water injection system as claimed in claim 1 further including filter means located between said reservoir means and said nozzle means.

5. A water injection system as claimed in claim 1 further including check valve means between said pump means and said nozzle means.

6. A water injection system as claimed in claim 3 further including means independent of said control means for varying the voltage applied to said pump means.

7. A water injection system as claimed in claim 1 wherein said diaphragm means includes a pair of diaphragms.

8. A water injection system as claimed in claim 3 wherein said switching means is movable between a first position wherein current may pass to said pump means and a second position wherein current is prevented from passing to said pump means.

9. A water injection system as claimed in claim 7 wherein said switching means is movable between a first position wherein current is prevented from passing to said pump means, a second position wherein current may pass to said pump means and a third position different from said first position wherein current is again prevented from passing to said pump means.

* * * * *